Aug. 8, 1933.  H. W. FAWCETT  1,921,181
CENTRIFUGAL SEPARATOR
Filed June 1, 1931  5 Sheets-Sheet 1

Fig. 1.

INVENTOR
Harold William Fawcett

Aug. 8, 1933.   H. W. FAWCETT   1,921,181
CENTRIFUGAL SEPARATOR
Filed June 1, 1931   5 Sheets-Sheet 2

INVENTOR
Harold William Fawcett
By Spear, Donaldson & Hoop
Attys

Patented Aug. 8, 1933

1,921,181

UNITED STATES PATENT OFFICE 1,921,181

CENTRIFUGAL SEPARATOR

Harold William Fawcett, Harrogate, England

Application June 1, 1931, Serial No. 541,478, and in Great Britain June 6, 1930

18 Claims. (Cl. 233—20)

This invention relates to centrifugal separators of the type having one or more discharge apertures for solids and/or other heavy constituents, such as slimes, separated out by the machine.

The invention aims at providing a centrifugal separator of the foregoing type from which solids and/or heavy constituents (hereinafter collectively referred to as "sludge") are adapted to be discharged during the rotation of the separator without interfering with the flow through the separator of liquid intended to undergo purification therein (hereinafter termed "useful liquid") and without the discharge apertures becoming obstructed and moreover without any appreciable loss of liquid to be purified or of purified liquid taking place through said discharge apertures.

A further object of the invention is to maintain always a layer or seal of sludge between the useful liquid and the sludge discharge apertures.

Still a further object of the invention is to avoid any sudden rushes of sludge through the sludge discharge apertures.

Yet a further object of the invention is to provide a centrifugal separator of the foregoing type in which liability of the machine to get out of balance is reduced to a minimum.

Still a further object of the invention is to provide a centrifugal separator having a maximum separating capacity for its size.

Further objects and advantages of the invention will hereinafter appear as the description thereof proceeds.

In the practical operation of centrifugal separators sludges of diverse nature and physical properties are encountered.

Thus for example sludges may be wholly crystalline by nature or wholly amorphous or even of a jelly-like nature and consistency or they may consist of any combination of crystalline and amorphous constituents. Consequently, certain sludges tend to form hard compact masses, others compact gradually and others again remain permanently semi-liquid when in the centrifugal separator. Each type of sludge has its own peculiarities and drawbacks in regard to its behaviour in centrifugal separators. Thus for example, coarse crystalline sludge tends to jam the valves situated at the discharge apertures therefor and thus to hold same open and to permit the useful liquid to percolate through and to be lost through the sludge discharge apertures. On the other hand amorphous sludge and/or sludges having a tendency to compact gradually tend to choke up the discharge pockets or apertures if left too long in the separator and can then only be discharged by increasing the area of the discharge passage. Finally, sludges of a jelly-like or liquid nature necessitate the use of valves or discharge apertures of extremely small dimensions and very rapid action since the danger otherwise arises that useful liquid will issue through the sludge discharge apertures and the sludge layer interposed between the useful liquid and the sludge discharge apertures will be disrupted or discharged.

Certain embodiments of centrifugal separators in accordance with the invention, which are adapted to deal with the various kinds of sludges hereinbefore enumerated, will hereinafter be described with reference to the accompanying drawings in which:—

In the different figures of the drawings, for the sake of simplicity, like parts are denoted by the like reference characters.

Figure 1:
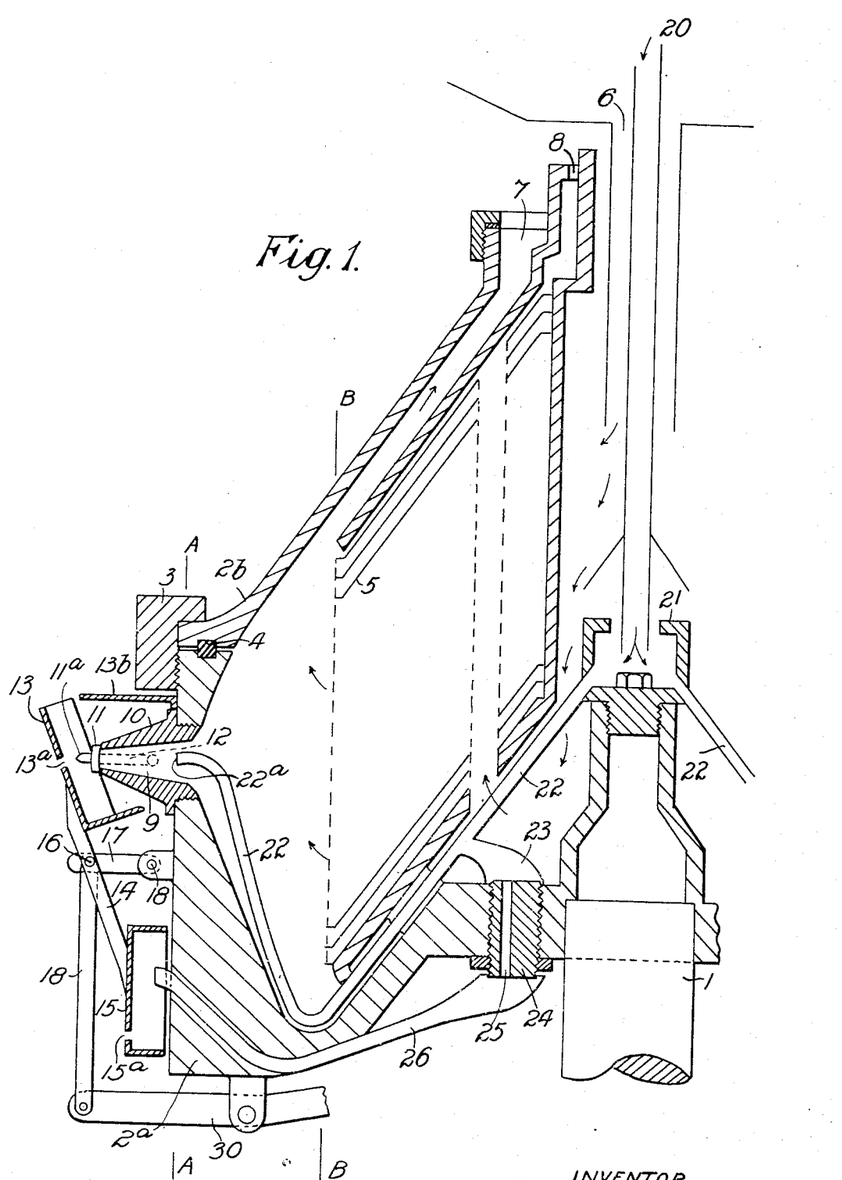
Fig. 1 is a half section of one embodiment.
Figure 2:
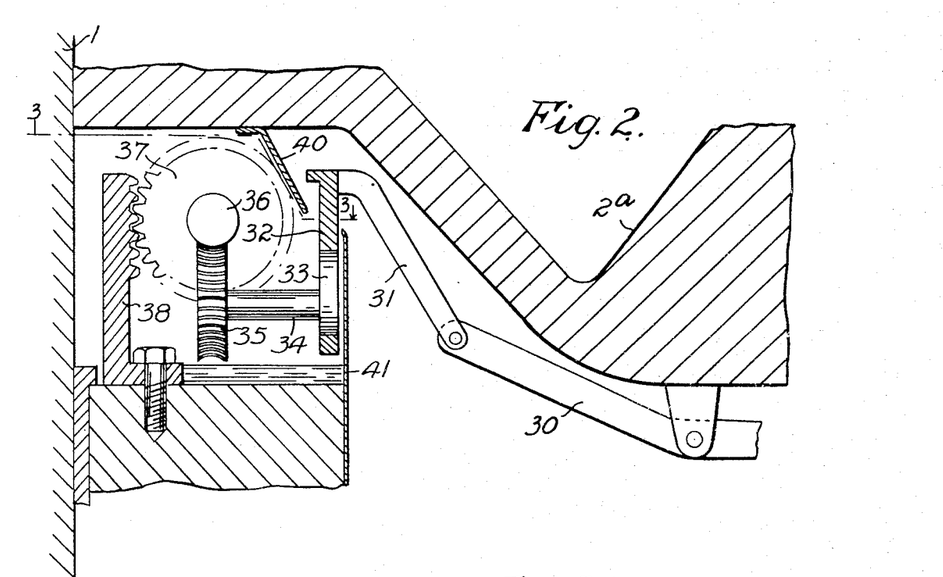
Fig. 2 is a detail of Fig. 1 on a larger scale.
Figure 3:
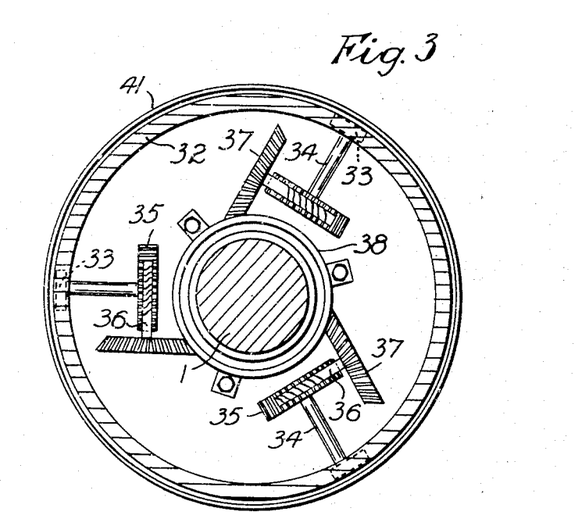
Fig. 3 is a plan of Fig. 2 on a smaller scale.

In the embodiment shown in Figs. 1 to 3, 1 indicates the rotary spindle of the centrifugal separator on which is mounted the rotary casing 2a, 2b. The parts 2a and 2b are secured together by means of a lock ring 3 with the interposition of a rubber or the like packing ring 4. 5 denotes the conical separating plates which rotate together with the casing. Liquid to be purified is introduced into the casing through a feed pipe 6 and the separated liquid constituents escape according to their density, through outlets 7 and 8. The sludge escapes through peripheral discharge apertures 9 only one of which is shown in Fig. 1.

Said discharge aperture 9 is formed by a nozzle 10 screwed into the casing 2a. Sliding in front of the aperture 9 is a valve member 11 pivotally connected by links 12 to the nozzle 10.

By virtue of the sliding or shearing action of the valve member 11 across the discharge aperture 9, during its closure any crystalline particles on said valve member are brushed off and thus prevented from jamming the valve in the open position. Moreover the member 11 need not abut tightly against the discharge aperture 9 since during the operation of the separator a slight interval between the two will become choked by sludge.

Facing the nozzle 10 is a tray member having an opening 13a adapted to be engaged by a stop 11a on the valve 11. Said tray member 13 is carried by a lever 14 the other end of which carries a cup 15 having a leak hole 15a. Lever 14 is pivoted at 16 on a link 17 which in turn is pivotally mounted at 17a on casing 2a. Link 17 is connected at 16 to a rod 18 to which a reciprocating motion is imparted in the manner hereinafter described.

20 denotes an inlet for an additional liquid preferably liquid previously purified in the separator serving solely as a medium for operating the valve 11 on the sludge attaining a certain depth. Said additional liquid flows down an axial conduit 20 into a small distributing bowl 21 from whence it is led by pipes 22 to the vicinity of the discharge nozzles 10. Branching off from each pipe 22 is a branch pipe 23 leading to a screw plug 24 having an eccentric hole 25. Said screw plug can be turned to adjust radial distance of the hole 25. Connected to the underside of the plug 24 is a branch pipe 26 which opens into the cup 15.

As previously stated a reciprocating movement is imparted to the rod 18. To this end said rod 18 is connected to a lever 30 which in turn is connected to a projection 31 integral with a ring 32 located at the underside of the casing 2a near the axis of the separator. Said ring 32 rests on three cams or eccentrics 33, mounted on spindles 34 suspended by bearings (not shown) from the casing 2a. The cams 33 are driven by reduction gearing comprising a stationary worm shaft 38 engaged by a pinion 37 coaxial with a worm 36 driving a worm pinion 35 mounted on the shaft 34. Said reduction gearing is likewise suitably attached to the underside of the casing 2a and rotates round the worm shaft 38. In order to ensure lubrication of the reduction and cam gearing, rings 40 and 41 of tinware are provided, the ring 41 forming an oil bath and the ring 40 serving to deflect all oil back into the oil bath. If desired, the spindle 34 for example, may carry suitable agitating members serving to splash up the oil from the oil bath on to the gearing.

The machine operates as follows:—

Liquid introduced at 6 is separated into its constituents in the casing 2a, 2b with the aid of the conical plates 5, the purified liquid constituents leaving the casing at 7 and 8. The separated sludge collects in the nozzles 10 to a gradually increasing depth. Additional liquid supplied through conduits 20 and 22 issues through outlet 22a and mingles with the purified liquid escaping along with it from outlet 7. While the outflow of additional liquid through 22a remains unobstructed no liquid passes through the branch conduits 23 and 26 since the hole 25 is so located and adjusted as to be nearer the axis of the separator than the outlet 7. However when sludge has accumulated in the nozzle 9 to a sufficient depth to obstruct the free outflow of liquor from outlet 22a the additional liquid is constrained to take the alternative path through conduits 23 and 26, and to enter the vessel 15. Under the influence of the liquid which flows therein the cup 15 overcomes the balancing weight of the tray 13 and flies outwardly, thus forcing the tray 13 inwards. The entire mechanism (viz. cup 15, tray 13 and lever 14) is meanwhile being slowly moved up and down by the cams 33, ring 32 and connecting rods 30 and 18 with the result that when the tray 13 moves inwards the projection 11a comes in line with and enters the hole 13a and the valve 11 is then forced sideways off its seating. Sludge thereupon issues through opening 9 and impinges on the tray 13 filling said tray and being prevented from sliding off it by a plate 13b, which in the innermost position forms the fourth side of the tray. Meanwhile additional liquid is leaking away through the hole 15a in the cup 15. When sufficiently filled with sludge the tray 13 overcomes the action of the liquid-filled cup 15 and flies outwardly thereby disengaging the pin 11a from the hole 13a and the sludge then slides off over the now open side of the tray whilst the valve 11 is left free and closes under the action of centrifugal force. If the outlet 22a should still be obstructed by accumulated sludge the foregoing action automatically repeats itself until the outlet 22a is free.

The sludge in nozzle 10 may vary in consistency. In order to prevent a rush of sludge and loss of all the sludge contained in the nozzle 10, the sludge must be discharged slowly. Sludge of a fluid nature will pass readily out of a very small aperture whilst dry compact sludge will only discharge through a comparatively large aperture. In the foregoing embodiment the valve is arranged to open slowly with the result that the sludge is always discharged from the minimum necessary aperture. Moreover by suitably selecting or adjusting the weight of the tray 13 the sludge can be removed in portions of substantially uniform weight irrespective as to whether it is of a crystalline amorphous or jelly-like nature.

The action of the mechanism is therefore to promote the discharge of sludge once same has risen to the level of 22a and to stop the discharge of sludge once the line of same is outside 22a and thus to promote the discharge of sludge while maintaining always a seal of sludge over the valve 11.

The tray 13 may be omitted and replaced by a counterweight in which case the duration of opening of the valve will be determined by the length of time it takes for the cup 15 to empty, once the outlet 22a is no longer obstructed.

The sludge may be caused to travel to the sludge pockets containing the discharge nozzles 10 either by centrifugal force alone, as shown in Fig. 1, if desired over suitable guiding means and if desired its travel may be assisted by conveying means such as scrapers (not shown).

The slide valve 11 may be replaced by any suitable other means, such as for example, an apertured diaphragm, a flexible conduit or a valve of any other known type, such as for example, a disc valve, flap valve, piston valve, sluice valve or the like, which may be balanced or unbalanced, or by conveyor means, such as for example, a gear pump or a pump of other suitable type.

Figures 4, 6:
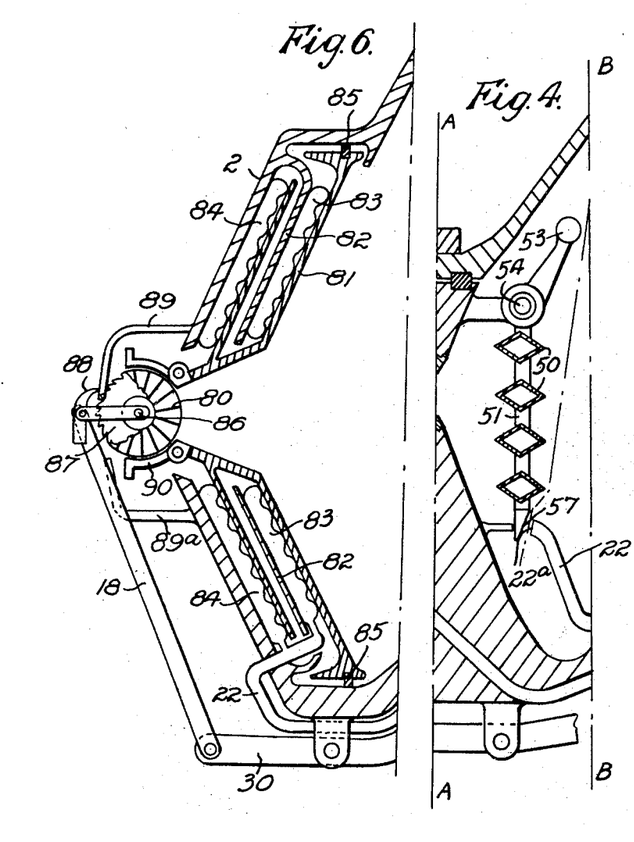
Fig. 4 is a partial section through a second embodiment between the lines a—a and b—b of Fig. 1.
Fig. 6 is a partial section of a fourth embodiment.
Figure 4A:
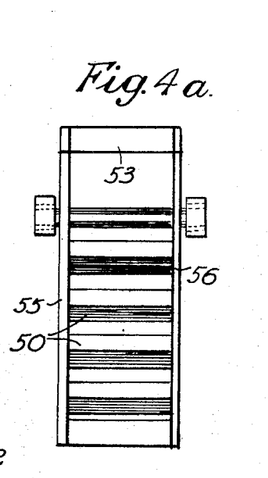
Fig. 4a is an end view of the member 50, 51, 52, 53 of Fig. 4.

In the embodiment shown in Fig. 4 the mechanism for determining the opening and closing of the valve 11 consists of floats 50 mounted on one arm 51 of a lever 51, 52, carrying a counterweight 53 and pivoted at 54 to the innerside of the casing 2b. The floats 50 are so shaped as to prevent any sludge resting permanently thereon and are preferably mounted between arms 55, 56.

Located at the lower end of the arm 51 is a closure member 57 for the opening 22a. In all other respects this embodiment is the same as that described with reference to Figs. 1 to 3.

The machine operates as follows:—

On the sludge exceeding a certain depth it carries the float inwardly thus preventing the outflow of liquid from the opening 22a and the additional liquid is constrained to flow along the alternative path provided by the conduits 23, 26, thereby flowing into cup 15 and causing the tray 13 to engage the valve 11 substantially in the manner described with reference to Figs. 1 to 3 of the drawings.

This mechanism is suitable for maintaining a substantially constant layer of sludge over the valve 11 where said sludge itself is of too fluid a nature to obturate the outlet 22a.

Figure 5:
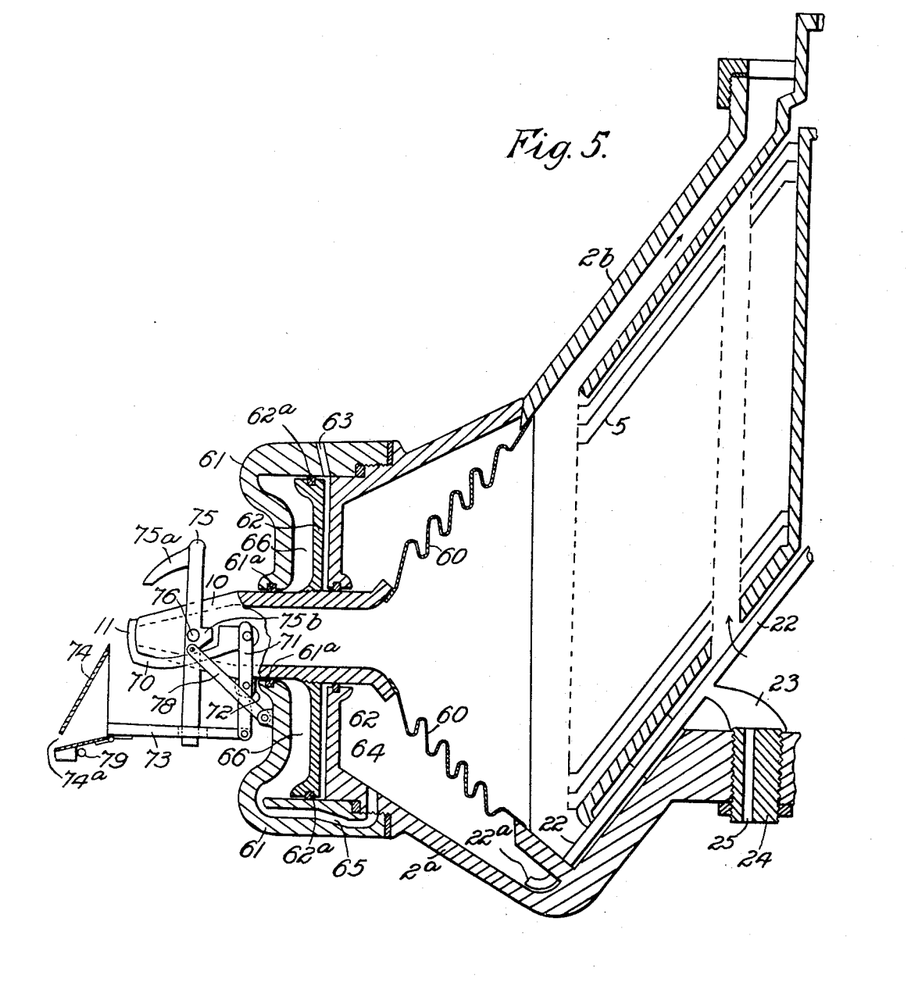
Fig. 5 is a half section through a third embodiment.

In the embodiment illustrated in Fig. 5 the operation of the valve 11 is determined by the weight of the sludge accumulating in the sludge pocket. Said sludge pocket is formed by a suitably corrugated conical distensible diaphragm 60.

The discharge nozzle 10 is connected to the diaphragm 60 but is free to slide radially with respect to the casing and to a member 61 screwed on to the casing. Slidingly arranged within the member 61 is a piston 62 provided with a packing ring 62a to ensure fluid tightness. The member 61 is also provided with a drain hole 63 at the rear of the piston 62 for the purpose hereinafter described. A packing ring 61a is also interposed between the members 61 and the moving nozzle 10. The pipe 22 supplies additional liquid to the space 64 between the diaphragm 60 and the casing and a conduit 65 establishes communication between the space 64 and a space 66 in the member 61 in front of the piston 62. The pressure of the additional liquid is adapted to be regulated by the eccentrically bored screw plug 24, 25. By virtue of the foregoing construction it is possible for the discharge nozzle 10 to move radially outward under the influence of the accumulation of sludge behind the distensible diaphragm 60.

The valve 11 is mounted on a bent arm 70 connected to a lever 71 fulcrumed on a member 72 mounted on the nozzle 10. The other arm of the lever 71 is pivotally secured to a slotted arm 73, carrying a receptacle 74 for sludge having an opening 74a for the escape of sludge therefrom. Passing through the slot in the arm 73 is a lever 75 pivoted at 76 to the nozzle 10 and connected by a link 78 to the stationary member 61. At its free upper end, the arm 75 has an arcuate projection 75a and in the vicinity of the pivot 76 it has a further projection 75b normally engaging a corresponding recess in the arm 70.

The machine operates as follows:—When a certain quantity of sludge has accumulated in the sludge pocket the diaphragm 60 and nozzle 10 move outwardly counter to the inward pressure of the liquid in the chambers 64 and 66 which latter are compressed causing a part of the liquid to flow out through the hole 25. As the nozzle 10 moves outwards the lever 75 is tilted counterclockwise by the link 78 thereby disengaging the catch 75b and at the same time it moves the arm 71 counterclockwise and allows the valve to move away from but in line with its seating. On the further continuation of this movement the projection 75a strikes against the valve 11 and opens same in a downward direction and guides the sludge into the sludge tray when the valve is fully open thereby allowing a portion of the accumulated sludge to discharge into the mud tray 74. When sufficient sludge has been discharged through opening 9, the diaphragm 60 and nozzle 10 return to their former initial position due to the liquid pressure in the chambers 64 and 66 and the valve 11 is first drawn radially inwards to its full extent and then allowed to swing into the closed position under the influence of centrifugal force. By means of a stationary stop 79 the flap 74b of the sludge tray is closed on the inward motion of the sludge tray whilst it is free to open on the valve returning to the closed position thereby permitting the discharge of the sludge contained therein. The type of valve herein described has the advantage of great sensitivity, requiring a very small opening force owing to the fact that frictional resistance to its initial opening movement is reduced to a minimum by the valve first moving outwardly away from its seating.

The machine described with reference to Fig. 5 is capable of dealing with sludges of any consistency from fluid to crystalline.

A valve of the type described with reference to Fig. 5 may also be substituted for the valve arrangements described with reference to Figs. 1 to 4 in which case the positive driving means 18 and 30 to 38 can be dispensed with and the leaking cup 15 attached to the lever 75.

Fig. 6 illustrates a further embodiment wherein the discharge of sludge is dependent on the weight of sludge behind the discharge aperture and in this embodiment the resistance is in the form of a vane wheel 80. The sludge pocket is formed by a conical member 81 which is held away from the casing 2 and an annular web 82 integral therewith by a pair of intercommunicating bellows 83, 84. The bellows are supplied with an additional liquid through pipe 22 which is again provided with an overflow similar to the overflow 24, 25 described with reference to Fig. 5. It will be seen that the conical member 81 is free to move radially in the casing 2. A packing ring 85 is provided in order to avoid sludge entering into the space occupied by the bellows 83, 84. If desired a drain hole (not shown) may also be provided for the removal of any sludge which has leaked past the packing ring 85. The vane wheel 80 is mounted on a spindle 86 and is fast with a ratchet wheel 87 adapted, on the radially outward movement of the member 81 to be engaged by a pawl 88 which is moved up and down by the rod 18 in a similar manner as that described with reference to Figs. 1 to 3. The pawl 88 is prevented from engaging the ratchet wheel 87 when the latter is in a retracted position, by a stop 89.

In order to prevent leakage of sludge past the vane wheel 80 hinged extensions 90 are provided on the member 81 to cover one or more partitions of the vane wheel and thereby to ensure sludge-tightness.

The machine operates as follows: When a sufficient amount of sludge has accumulated behind the member 81, said latter is forced outwardly by the centrifugal weight of the accumulated sludge, carrying with it the vane wheel 80 and ratchet wheel 87. Coincident with the outward movement of the member 81 the bellows 83, 84 are compressed and a part of the additional liquid escapes from the regulatable overflow 24, 25. When the ratchet wheel 87 has moved so far outwards that its teeth project beyond the stop 89 it is engaged by the reciprocated pawl 88 and turned thereby discharging part of the sludge contained in the sludge pocket in small amounts at a time. When sufficient sludge has been discharged by the vane wheel 80 the member 81 moves radially inward and withdraws the ratchet wheel 87 from the pawl 88 which then abuts against the stop 89 whilst the ratchet wheel and vane wheel cease rotating. During the outward movement of the vane wheel the hinged members 90 are caused to abut against stops 89, 89a and to move apart so as to reduce the frictional resistance to the rotation of the vane wheel 80.

This embodiment advantageously operates with sludges of fluid consistency owing to the fact that the vane wheel prevents any sudden rush of sludge from the discharge aperture.

Figure 7:
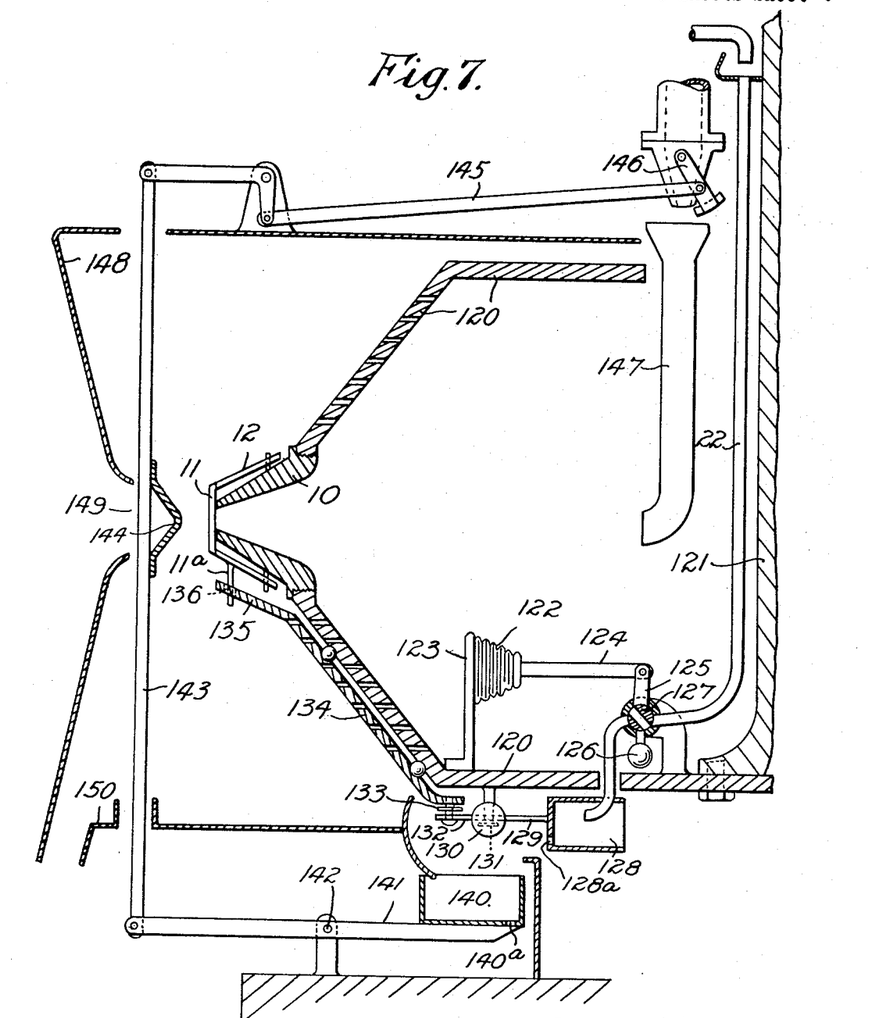
Fig. 7 is a section through a crystal centrifuge embodying the invention.

Fig. 7 illustrates the application of the invention to a centrifuge for drying or straining crystals comprising a basket 120 slung from a spindle 121 driven by an overhead drive (not shown). 122 indicates a collapsible bellows suitably mounted on a bracket 123 secured to the basket 120. The bellows 122 are connected by links 124 and 125 to a counterweight 126. Link 125 is pivoted at 127 and the pivot forms a valve adapted to shut off the supply of an additional liquid through a pipe 22 to a cup 128. Said cup 128 is mounted on a bell crank lever 129 provided with counterweight 130 and pivoted at 131. The bell crank lever 129 further has an arm 132 connected by a link 133 to a frusto conical member 134 normally rotating with the basket 120 but capable of a small angular movement with respect to the basket. The member 134 carries a ring 135 provided with recesses 136 into which engage a pin 11a on the slide valve 11 mounted by links 12 on the discharge nozzle 10.

Figure 7A:
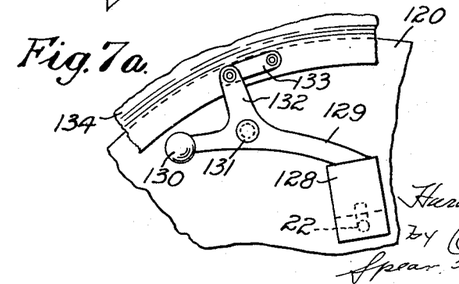
Fig. 7a is a detail of Fig. 7.

The cup 128 is provided with a leakhole 128a through which liquid leaks into a cup 140 provided with a leak hole 140a. The cup 140 is mounted on a lever 141 pivoted at 142 to a stationary part of the machine. Said lever is connected at its other end to a rod 143 carrying a deflector member 144 and actuating through rodwork 145a slide valve 146 adapted to shut off the supply of crystal sludge to be treated, to the interior of the basket 120 through supply pipe 147. The basket is enclosed in a casing 148 having an aperture 149 for the discharge crystals and an outlet 150 for the discharge of liquid.

The machine operates as follows:—On the depth of the layer of draining crystals increasing to a sufficient extent to submerge the bellows 122 these are compressed and open the valve 127 thereby permitting additional liquid to enter the cup 128. The leak hole 128a is of such dimensions that it takes a very considerable period to fill the cup 128 and thus permits the crystals to drain for a sufficiently long period. While this filling is taking place the liquid draining from the cup 128 fills the cup 140 which moves downwardly thereby shutting off the supply of crystal sludge to the machine and moving the deflector member 144 upwardly. On the cup 128 filling it imparts a jerky angular motion relative to the rotating basket 120, to the ring 134 thereby opening all the valves 11 simultaneously. The cup 128 is so balanced by the counterweighted lever that it will keep the valve 11 open for a considerable period until all the crystals have been discharged. Thereupon the pressure of the accumulated crystals on the bellows 122 is relieved and the valve 127 is returned to the closed position by the counterweight 126. The cups 128 and 140 empty, thereby closing the slide valve 11 and opening the crystal sludge supply valve 146 whereupon the cycle of operations is repeated.

The valves hereinbefore referred to may also comprise a double valve of the disc type or sliding type, preferably of the lost motion type such that the inner disc closes first allowing all sludge remaining between the inner and outer discs to be centrifuged out of the machine before the outer disc closes and thus provide a clean seating on which the outer valve can close tightly.

The operation of the valves hereinbefore referred to may be rendered very sensitive if the valve be connected to one arm of a lever, the other arm of which is connected to a diaphragm which latter is preferably located nearer the axis of the separator than the sludge pocket and is consequently acted upon by the useful liquid, the sludge pocket itself being supported on a yielding diaphragm and tending, under the increased weight due to accumulated sludge, to open the valve. The diaphragm may also be so arranged that the liquid exerts a pressure on the outer side thereof.

The sludge pocket may also be formed by a tube of relatively large diameter at the same time constituting the discharge aperture for the sludge. Said tube is provided with a deformable or distensible portion which is surrounded by a jacket containing liquid the pressure of which can be varied by any suitable means, to constrict or close or open the sludge pocket. This construction obviates the necessity for mechanical valves. Means may be provided for relieving the strain on the flexible portion of the sludge pocket when closing under the action of the pressure applied thereto.

Alternatively the sludge on exceeding a certain depth may be caused to obstruct a pipe through which liquid is normally supplied to a valve closing mechanism, the consequent cutting off of the liquid supply through said pipe causing the valve to open.

In any method of carrying out the invention it may be advantageous to magnify the controlling effect of the weight, depth, density or the like of the sludge by suitable magnifying systems which may be mechanical or hydraulic in which latter case the hydraulic power is preferably derived from a water supply or a liquid undergoing centrifugation in the separator or from liquid previously clarified in the separator.

Means may be provided in or on the sludge discharge apertures or pockets which are adapted to prevent a rush of sludge through the sludge discharge apertures and to ensure an even outflowing sludge irrespective of its nature and consistency. Thus the sludge discharge aperture or pocket may be fitted with two oppositely disposed diaphragms each carrying an apertured plate and arranged that the plates slide on each other with the aperture in said plates registering when the diaphragms are not distended but a progressively smaller aperture being formed as the diaphragms become distended under the pressure transmitted through the sludge.

The diaphragms are forced inwards against the sludge prior to the opening of the valve and are then released. Such diaphragms working in conjunction with the foregoing valve may form a control apparatus operating as follows:—

The valve opening mechanism may open the valve rapidly and then disengage, the valve remaining open until the sludge has been discharged to the desired level when the flexible diaphragm will close the valve. The initial valve opening may be arranged to take place at certain regular time intervals.

I wish it to be understood that in carrying out my invention, I intend to avoid the use of substantial external counterweights on the centrifugal separators constructed according to my invention, since I have found that by reason of their varying centrifugal weight as they move towards or away from the axis of the separator they are relatively insensitive and by reason of their jerky action they are liable to set up heavy shock stresses with consequent heavy wear.

I claim:—

1. In a centrifugal separator, a rotatable separating bowl having peripheral sludge discharge apertures, means for admitting material to be separated into said bowl, outlet means for purified liquid, valves for said peripheral sludge discharge apertures normally keeping said apertures closed under the influence of centrifugal force, liquid-operated means reciprocating in relation to said peripheral outlet valves, a liquid supply conduit adapted to be choked on the separated sludge exceeding a given depth, and a by-pass conduit branching from said liquid supply conduit and adapted when said latter is choked to supply liquid to said liquid-operated means to bring same into operative engagement with the peripheral outlet valves to open said latter.

2. In a centrifugal separator, a rotatable separating bowl having peripheral sludge discharge apertures, means for admitting material to be separated into said bowl, outlet means for purified liquid, valves for said peripheral sludge discharge apertures normally keeping said apertures closed under the influence of centrifugal force liquid-operated means reciprocating in relation to said peripheral outlet valves, a liquid supply conduit, float means adapted to be engaged by the separated sludge on exceeding a given depth, and to choke the liquid supply conduit, and a by-pass conduit branching from said liquid supply conduit and adapted when said latter choked to supply liquid to said liquid operated means to bring same into operative engagement with the peripheral outlet valves to open said latter.

3. In a centrifugal separator, a rotatable separating bowl having peripheral sludge discharge apertures, means for admitting material to be separated into said bowl, outlet means for purified liquid, rotatable valve means for said peripheral sludge discharge apertures normally keeping said apertures closed under the influence of centrifugal force, means reciprocating in relation to said rotatable peripheral outlet valves, and means governed by the weight of the sludge within the separating bowl for automatically bringing the rotatable valve means and the reciprocating means into operative engagement.

4. In a centrifugal separator, a rotatable separating bowl having peripheral sludge discharge apertures, means for admitting material to be separated into said bowl, outlet means for purified liquid, valves for said peripheral sludge discharge apertures normally keeping said apertures closed, means governed by the accumulation of the sludge within the separating bowl for diverting a control liquid present in the separator and means operated on the diversion of said control liquid for opening said peripheral outlet valves, said control-liquid diverting means being so disposed inside the casing of the separator, that they are set into operation by the accumulating sludge before said latter has accumulated to a sufficient extent to substantially obstruct the flow of liquid undergoing purification through the separator.

5. In a centrifugal separator, a rotatable separating bowl having peripheral sludge discharge apertures, means for admitting material to be separated into said bowl, outlet means for purified liquid, valves for said peripheral sludge discharge apertures normally keeping said apertures closed under the influence of centrifugal force, means governed by the accumulation of the sludge within the separating bowl for diverting a control liquid present in the separator and means operated on the diversion of said control liquid for opening said peripheral outlet valves, said control-liquid diverting means being so disposed inside the casing of the separator, that they are set into operation by the accumulating sludge before said latter has accumulated to a sufficient extent to substantially obstruct the flow of liquid undergoing purification through the separator.

6. In a centrifugal separator, a rotatable separating bowl having peripheral sludge discharge apertures, means for admitting material to be separated into said bowl, outlet means for purified liquid, slide valves individual to and co-rotating with said peripheral sludge discharge apertures and normally keeping said apertures closed, means governed by the depth of the sludge within the separating bowl for diverting a control liquid present in the separator and means operated by the diversion of said control liquid for opening said peripheral outlet valves, said control-liquid diverting means being so disposed inside the casing of the separator, that they are set into operation by the accumulating sludge before said latter has accumulated to a sufficient extent to substantially obstruct the flow of liquid undergoing purification through the separator.

7. In a centrifugal separator, a rotatable separating bowl having peripheral sludge discharge apertures, means for admitting material to be separated into said bowl, outlet means for purified liquid, valves for said peripheral sludge discharge apertures normally keeping said apertures closed, means governed by the weight of the sludge within the separating bowl for diverting a control liquid present in the separator and means operated on the diversion of said control liquid for opening said peripheral outlet valves, said control-liquid diverting means being so disposed inside the casing of the separator, that they are set into operation by the accumulating sludge before said latter has accumulated to a sufficient extent to substantially obstruct the flow of liquid undergoing purification through the separator.

8. In a centrifugal separator, a rotatable separating bowl having peripheral sludge discharge apertures, means for admitting material to be separated into said bowl, valves for said peripheral sludge discharge apertures normally keeping said apertures closed, compressible means engaged and compressed by the sludge on exceeding a given depth within the separating bowl for diverting a control liquid present in the separator, a receiver for the diverted control liquid and means operated by said receiver on being filled with control liquid for opening said peripheral outlet valves.

9. In a centrifugal separator, a rotatable separating bowl having peripheral sludge discharge apertures, means for admitting material to be separated into said bowl, valves for said peripheral sludge discharge apertures normally keeping said apertures closed under the influence of centrifugal force, compressible means engaged and compressed by the sludge on exceeding a given depth within the separating bowl, an arm connected to said compressible means, a supply conduit for a control liquid, a valve connected to said arm and controlling the supply of said control liquid, a receiver for said control liquid and means operated by said receiver on being filled with control liquid for opening said peripheral outlet valves.

10. In a centrifugal separator, a rotatable separating bowl having peripheral sludge discharge apertures, means for admitting material to be separated into said bowl, valves for said peripheral sludge discharge apertures normally keeping said apertures closed, compressible means engaged and compressed by the sludge on exceeding a given depth within the separating bowl for diverting a control liquid present in the separator, a receiver for the diverted control liquid and rodwork operated by said receiver on being filled with control liquid to open said peripheral outlet valves.

11. In a centrifugal separator, a rotatable separating bowl having peripheral sludge discharge apertures, means for admitting material to be separated into said bowl, valves for said peripheral sludge discharge apertures normally keeping said apertures closed under the influence of centrifugal force, compressible means engaged and compressed by the sludge on exceeding a given depth within the separating bowl, an arm connected to said compressible means, a supply conduit for a control liquid, a valve connected to said arm and controlling the supply of said control liquid, a receiver for said control liquid and rodwork operated by said receiver on being filled with control liquid to open said peripheral outlet valves.

12. In a centrifugal separator, a rotatable separating bowl having peripheral sludge discharge apertures, means for admitting material to be separated into said bowl, valves for said peripheral sludge discharge apertures normally keeping said apertures closed, a piston moved by the sludge on exceeding a given depth within the separating bowl against the pressure of a control liquid present in the separator and means operated by the movement of said piston for opening said peripheral outlet valves.

13. In a centrifugal separator, a rotatable separating bowl having peripheral sludge discharge apertures, means for admitting material to be separated into said bowl, valves for said peripheral sludge discharge apertures normally keeping said apertures closed under the influence of centrifugal force, a piston moved by the sludge on exceeding a given depth within the separating bowl against the pressure of a control liquid present in the separator and rodwork operated by the movement of said piston for opening said peripheral outlet valves.

14. In a centrifugal separator, a rotatable separating bowl having peripheral sludge discharge apertures, means for admitting material to be separated into said bowl, rotary valves for said peripheral sludge discharge apertures, a piston member carrying said rotary valve and moved by the sludge on exceeding a given depth within the separating bowl against the pressure of a control liquid present in the separator and reciprocated rodwork coming into operative engagement with said rotary valve to rotate same on the outward movement of said piston member.

15. In a centrifugal separator, a rotatable separating bowl having peripheral sludge discharge apertures, means for admitting material to be separated into said bowl, outlet means for purified liquid, valves for said peripheral sludge discharge apertures normally keeping said apertures closed, liquid-operated means reciprocating in relation to said peripheral outlet valves, an open-ended liquid supply conduit adapted to be choked on the separated sludge exceeding a given depth, and a by-pass conduit branching from said liquid supply conduit and adapted when said latter choked to supply liquid to said liquid-operated means to bring same into operative engagement with the peripheral outlet valves to open said latter.

16. In a centrifugal separator, a rotatable separating bowl having peripheral sludge discharge apertures, means for admitting material to be separated into said bowl, outlet means for purified liquid, valves individual to and co-rotating with said peripheral sludge discharge apertures normally keeping said apertures closed under the influence of centrifugal force, liquid-operated means reciprocating in relation to said peripheral outlet valves and individual thereto, at least one liquid supply conduit adapted to be choked on the separated sludge exceeding a given depth, and a by-pass conduit branching from said liquid supply conduit and adapted when said latter choked to supply liquid to said liquid-operated means to bring same into operative engagement with the peripheral outlet valves to open said latter.

17. In a centrifugal separator, a rotatable separating bowl having peripheral sludge discharge apertures, means for admitting material to be separated into said bowl, valves for said peripheral sludge discharge apertures normally keeping said apertures closed, counterweighted bellows engaged and compressed by the sludge on exceeding a given depth within the separating bowl, means operatively connected to said bellows for diverting a control liquid present in the separator, a receiver for the diverted control liquid and means operated by said receiver on being filled with control liquid to open said peripheral outlet valves.

18. In a centrifugal separator, a rotatable separating bowl having peripheral sludge discharge apertures, means for admitting material to be separated into said bowl, valves for said peripheral sludge discharge apertures normally keeping said apertures closed under the influence of centrifugal force, counterweighted bellows engaged and compressed by the sludge on exceeding a given depth within the separating bowl, an arm connected to said bellows means, a supply conduit for a control liquid, a valve connected to said arm and controlling the supply of said control liquid, a receiver for said control liquid and means operated by said receiver on being filled with control liquid to open said peripheral outlet valves.

HAROLD WILLIAM FAWCETT.